United States Patent
Kulkarni et al.

(10) Patent No.: US 10,409,821 B2
(45) Date of Patent: Sep. 10, 2019

(54) SEARCH RESULT RANKING USING MACHINE LEARNING

(71) Applicant: eBay Inc., San Jose, CA (US)

(72) Inventors: Parashuram Kulkarni, Santa Clara, CA (US); Abdelhalim Abbas, San Jose, CA (US); Michael Mathieson, Sunnyvale, CA (US); Jingzhou Hua, Santa Clara, CA (US); Jon Degenhardt, Mountain View, CA (US); Ramakrishnan Natarajan, San Jose, CA (US)

(73) Assignee: eBay, Inc., San Jose, CA (US)

( * ) Notice: Subject to any disclaimer, the term of this patent is extended or adjusted under 35 U.S.C. 154(b) by 1177 days.

(21) Appl. No.: 14/502,089

(22) Filed: Sep. 30, 2014

(65) Prior Publication Data

US 2015/0058331 A1 Feb. 26, 2015

Related U.S. Application Data

(63) Continuation of application No. 13/198,560, filed on Aug. 4, 2011, now Pat. No. 8,924,314.

(60) Provisional application No. 61/387,394, filed on Sep. 28, 2010.

(51) Int. Cl.
 *G06F 16/2457* (2019.01)
 *G06N 20/00* (2019.01)
 *G06F 16/951* (2019.01)

(52) U.S. Cl.
 CPC ...... *G06F 16/24578* (2019.01); *G06F 16/951* (2019.01); *G06N 20/00* (2019.01)

(58) Field of Classification Search
 CPC ....... G06N 99/005; G06N 20/00; G06F 17/30
 See application file for complete search history.

(56) References Cited

U.S. PATENT DOCUMENTS

| | | |
|---|---|---|
| 8,924,314 B2 | 12/2014 | Kulkarni et al. |
| 2006/0064411 A1 | 3/2006 | Gross et al. |
| 2007/0156621 A1 | 7/2007 | Wright et al. |
| 2008/0005047 A1 | 1/2008 | Flake et al. |
| 2008/0120292 A1 | 5/2008 | Sundaresan et al. |
| 2008/0140549 A1 | 6/2008 | Eder |
| 2008/0256069 A1 | 10/2008 | Eder et al. |
| 2008/0270250 A1 | 10/2008 | Bolivar et al. |
| 2009/0006179 A1* | 1/2009 | Billingsley ...... G06Q 10/06375 705/7.37 |
| 2009/0106165 A1 | 4/2009 | Solomon |
| 2009/0106232 A1 | 4/2009 | Burges et al. |

(Continued)

OTHER PUBLICATIONS

Agichtein, E., Brill, E., & Dumais, S. (2006). Improving web search ranking by incorporating user behavior information. In International ACM SIGIR conference on research and development in information retrieval (pp. 19-26).*

(Continued)

*Primary Examiner* — Eric Nilsson
(74) *Attorney, Agent, or Firm* — Shook, Hardy & Bacon, LLP

(57) ABSTRACT

Various embodiments include systems and methods for search result ranking using machine learning. A goal model can be created using machine learning. Responsive to a search query, a plurality of data factors can be inputted into the goal model to create a model output. Search results can be presented to a user based on the model output.

19 Claims, 6 Drawing Sheets

(56) References Cited

U.S. PATENT DOCUMENTS

2009/0138362 A1* 5/2009 Schroedl .............. G06Q 30/02
                                                    705/14.55
2009/0300547 A1 12/2009 Bates et al.
2011/0004509 A1  1/2011 Wu et al.
2012/0078825 A1  3/2012 Kulkarni et al.

OTHER PUBLICATIONS

"U.S. Appl. No. 13/198,560, Examiner Interview Summary dated Aug. 22, 2014", 3 pgs.

"U.S. Appl. No. 13/198,560, Final Office Action dated Jun. 19, 2014", 13 pgs.

"U.S. Appl. No. 13/198,560, Final Office Action dated Oct. 16, 2013", 12 pgs.

"U.S. Appl. No. 13/198,560, Non Final Office Action dated Feb. 26, 2014", 12 pgs.

"U.S. Appl. No. 13/198,560, Non Final Office Action dated May 1, 2013", 11 pgs.

"U.S. Appl. No. 13/198,560, Notice of Allowance dated Aug. 29, 2014", 5 pgs.

"U.S. Appl. No. 13/198,560, Response filed Jan. 16, 2014 to Final Office Action dated Oct. 16, 2013", 12 pgs.

"U.S. Appl. No. 13/198,560, Response filed May 27, 2014 to Non Final Office Action dated Feb. 26, 2014", 10 pgs.

"U.S. Appl. No. 13/198,560, Response filed Aug. 1, 2013 to Non Final Office Action dated May 1, 2013", 10 pgs.

"U.S. Appl. No. 13/198,560, Response filed Aug. 20, 2014 to Final Office Action dated Jun. 19, 2014", 11 pgs.

Loucks, Daniel P, et al., "Chapter 6: Data-Based Models", Water Resources Systems Planning and Management: An Introduction to Methods, Models and Applications, United Nations Educational, Scientific and Cultural Organization; ISBN 92-3-103998-9, (Feb. 2006), 41 pgs.

* cited by examiner

SEARCH RESULT RANKING USING MACHINE LEARNING

CLAIM OF PRIORITY

This application is a continuation of and claims the benefit of priority under to U.S. patent application Ser. No. 13/198,560, filed on Aug. 4, 2011, which claims the benefit of priority, under 35 U.S.C. Section 119(e), to U.S. Provisional Patent Application Ser. No. 61/387,394, entitled "SEARCH RESULT RANKING USING MACHINE LEARNING," filed on Sep. 28, 2010, all of which are hereby incorporated by reference in their entirety.

TECHNICAL FIELD

The present application relates generally to the technical field of electronic searching, and in one specific example, to search result ranking using machine learning.

BACKGROUND

In an online system providing search results based on user queries, often the objects being searched are evaluated under a variety of factors in order to produce search results that meet the user's needs as well as the needs of the online system. The factors may include numerous data points associated with the objects being searched, as well as context information associated with the user or the user query itself. Traditionally, people look at the factors and devise algorithms to accept and evaluate the factors to produce the search results.

BRIEF DESCRIPTION OF THE DRAWINGS

Some embodiments are illustrated by way of example and not limitation in the figures of the accompanying drawings in which.

DETAILED DESCRIPTION

Figure 1:
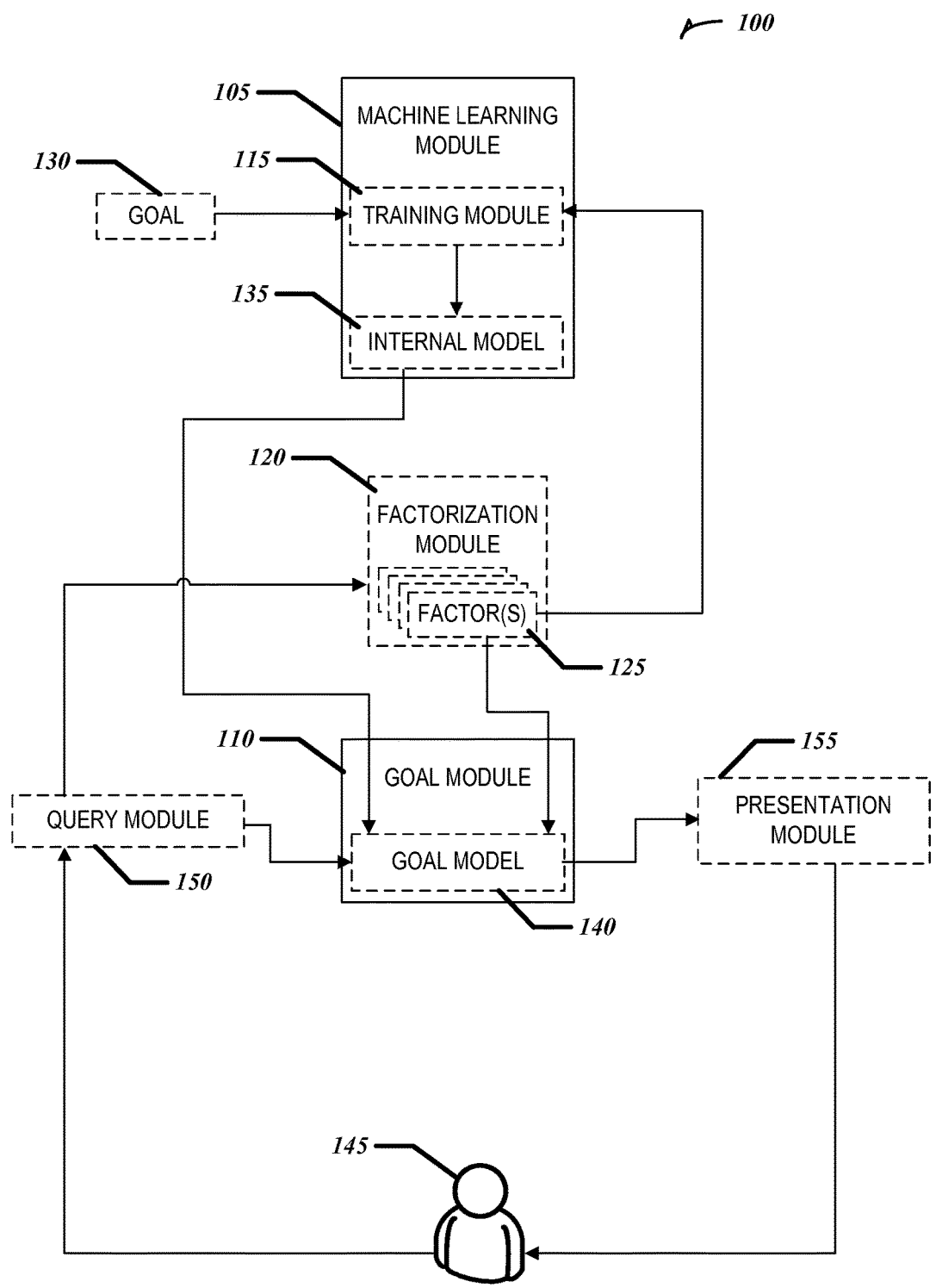
FIG. 1 is a block diagram of an example system for search result ranking using machine learning, according to one embodiment.

Example methods and systems for search result ranking using machine learning are herein described. In the following description, for purposes of explanation, numerous specific details are set forth in order to provide a thorough understanding of example embodiments. It will be evident, however, to one skilled in the art that embodiments of the present invention can be practiced without these specific details.

For users to access online resources, providers often provide a search service to locate resources pertinent to the user's interest. A goal of the provider is to provide results that satisfy several concerns of both the user and the provider, such as relevant results that induce the user to use the provider again, revenue generation for the provider, and satisfying business partner (e.g., advertisers or sponsors) concerns. When the provider is an e-commerce provider, the considerations of, for example, generating revenue from the sales of item listings returned in search results or business partner concerns can be particularly important (e.g., given more weight) in ranking the results than simply the relevance of an item to the search. The provider may have a tremendous amount and variety of information, which can be used to rank results, such as information about the resources it provides, information on user behavior (e.g., how often users have chosen a given resource in response to a search), provider revenue information, or business partner information. Often the provider will use parts of this information to identify and present resources as results in response to a user search in order to meet the provider's goals. Results can be ranked using the information, wherein the ranking may provide the order in which the results appear to the user.

Traditionally, a provider may spend a great deal of time attempting to determine which pieces of information in its possession are relevant to find and present user search results in a way to meet its goals. The chosen pieces of information often must be assembled, used as inputs into a variety of functions, and weighted against each other. All of these actions typically involve manual intervention by the provider at every step (e.g., identifying the data to be used, developing the functions, and determining relative weights of the functions). A more comprehensive discussion of the information, or relevance data, and how it can be used can be found in the following patent applications, both of which are incorporated herein by reference: U.S. application Ser. No. 11/679,973, entitled, "DETERMINING RELEVANCY AND DESIRABILITY OF TERMS", filed on Feb. 28, 2007, and U.S. application Ser. No. 11/821,928, entitled, "ECONOMIC OPTIMIZATION FOR PRODUCT SEARCH RELEVANCY", filed on Jun. 26, 2007.

A provider can ease the burden on its human resources by implementing (e.g., creating, updating, or hosting) and using models from the information using machine learning. The information can be factorized, or put into a standard format. In an example, the information can be manipulated (e.g., aggregating several pieces of information into a single value) when it is factorized. Provider goals can be identified and used to implement machine learning models. For example, goals can be defined as input labels into a machine learning system and correlated with factored information. A machine learning system can then be trained, using the labels and factorized information, to produce a model. After the model is produced, it can accept factorized information and produce an output to find or present user search results. The model can also be modified, over time, through further training By utilizing the power of machine learning, large amounts of information can be used to rank search results to meet provider goals without expending vast human resource capital.

FIG. 1 is a block diagram of an example system 100 for search result ranking using machine learning. System 100 can include a machine learning module 105 and a goal module 110. The machine learning module 105 can optionally include a training module 115 and an internal model 135. The goal module can optionally include a goal model 140. System 100 can also include other optional components, such as a goal 130, a factorization module 120 including one or more factors 125, a query module 150, and a presentation module 145.

The machine learning module 105 can be configured to implement (e.g., create, update, or host) a goal model 140. In an example, the machine learning module 105 can create the goal model 140 from a goal 130 and an input dataset. As used herein, the goal 130 is a goal the provider wishes to achieve via search result ranking. For example, the goal 130 could be the maximization of revenue via search result ranking. In an example, the goal 130 can be embodied as an input label that can be used in training a machine learning system.

The input dataset can include provider data that is determined to be relevant to the goal. For example, if revenue maximization is the goal, the input dataset can include information on the ratio of user impressions to purchases for electronic representations for items being sold in an online marketplace. Generally, the lower the ratio, the more likely the item will be sold if presented to a user. Other example data for the input dataset can include provider profit per item sold (e.g., high margin items), or business partner programs that result in increased provider profits (e.g., business partner payments for selling items).

In an example, the input dataset can comprise one or more data factors 125. A data factor 125 can be a standardized format to represent data. Data factors 125 can be data that has been placed into a standard format (e.g., factorized). In an example, the standard format can vary depending upon the ultimate goal 130. For example, data to be input into a revenue model can be factored into a first format, while data to be input into a sales model can be factored into a second format. Example data factors 125 can include: relevance of an item title; temporal data (e.g., when an item was listed, when a search query was performed); transaction data; impressions of item listings; item demand and supply; etc. In an example, a data factor 125 can be an aggregate of several pieces of data. For example, a data factor 125 can be the aggregated user clicks on a presented item listing divided by the aggregated user impressions for the item listing. In an example, the data factors 125 can be the aggregated user activity for a given keyword in a search query. Data factors 125 can be created by collecting data from various sources and using a data reducer to factorize the data (e.g., transform the data into the structured format). The factorized data can then be called an observation. In an example, observations can be problem specific; e.g., certain observations can be used in a relevance model while others can be used in a revenue model.

In an example, a data factor 125 can include a single data point retrieved from information available to the provider. In an example, the data factor 125 can be an aggregation of data points (e.g., a ratio of user clicks to user impressions for an item listing). Example data factors 125 can include: user data (e.g., user account, purchasing habits, credit rating, etc.); transaction data (e.g., transaction information related to item listings or users including items sold, user impressions, type of payment used, etc.); publication data (e.g., item listing date, item listing title, whether pictures are included with the item listing, whether sample information is available for the item listing, etc.); search query data (e.g., for the current or previous search queries, keywords used, time query was performed, initial results returned, etc.). In an example, the data factors 125 can be associated with the goal 130 in order to train the machine learning system.

In an example, data factors 125 can be provided by a factorization module 120. In an example, the factorization module 120 can be configured to compute or store data factors 125. In an example, the factorization module 120 can be configured to aggregate data into data factors 125. In an example, the factorization module 120 can be configured to factorize data based on the goal 130. For example, several pieces of raw data (e.g., user impressions and purchasing behavior of item listings) can be aggregated (e.g., to derive an impression to sale ratio) and then factorized for a first goal (e.g., maximizing revenue) and similarly factorized for a second goal (e.g., business partner agreement to display certain products where user impressions may be more relevant). In an example, the factorization module 120 can factorize data in a batch process (e.g., not in real-time). In an example, the factorization module 120 can be configured to factorize data in real-time (e.g., form the search query). Thus, the factorization module 120 can be configured to compute at least one data factor 125 from the plurality of data factors 125 prior to the search query. In an example, the factorization module 120 can also be configured to compute at least one data factor 125 from the plurality of data factors 125 following the search query.

In an example, the factorization module 120 can be configured to select a subset of available data factors 125. This can be useful in situations where available processing resources cannot process all available data factors 125. In an example, the factorization module 120 can be configured to receive the selection of data factors 125 from a user (e.g., via a user interface). In an example, the factorization module 120 can be configured to autonomously (e.g., without human intervention) select the subset of data factors 125.

In an example, the factorization module 120 can be configured to measure the impact a data factor 125 has on the model (e.g., the degree to which changes in the particular data factor 125 influence the model's output). In an example, the factorization module 120 can be configured to assign an impact score to the data factors 125. In an example, the data factors 125 can be ordered by their assigned impact scores. In an example, the subset of data factors 125 can be selected by selecting a predetermined number of data factors based on the impact score ordering. For example, if twenty data factors 125 are considered but only ten will be used, the twenty data factors 125 can be ordered and the first ten (e.g., most impactful or relevant) can be selected to produce the subset of data factors 125.

In an example, a data factor 125 can be assigned a plurality of impact scores. In an example, each of the plurality of impact scores can be associated with a goal 130. For example, a data factor 125 can have a first impact score associated with revenue generation and a second impact score associated with cross product marketing. In an example, the ordering of data factors can be based on the impact score associated with the currently relevant (e.g., modeled) goal.

After observations (e.g., data factors 125) are collected, they can be used as inputs into a machine learning system to create one or more models. In an example, commercial machine learning systems can be used (e.g., TreeNet). A particular goal 130 (e.g., problem to be solved) can be identified (e.g., search item relevance) and a goal model 140 produced to address the goal 130. Goals 130 can be reduced to input labels and fed into the machine learning system; input labels can also correspond to observations for the goal 130. The input labels can also correspond to desired outputs (e.g., the input label can include the desired output result).

In an example, input observations (e.g., observations that are part of the input dataset) can be assigned a plurality of weights between input observations. For example, a first observation can be assigned a first weight and a second observation can be assigned a second weight. The differing weights can correspond to the effect the observation has on the machine learning system. For example, if the first weight has a value of 1 and the second weight has a value of 10, then the machine learning system is a factor of ten more sensitive to changes in the second observation than to changes in the first observation. In an example, the model (e.g., internal model) of the machine learning system is modified based on the input observation weights. In an example, the input observation's value can be changed (e.g., multiplied) by its corresponding weight before it is inputted into the machine learning system.

Collected observations can be fed into the machine learning system when the system is being trained. In an example, training involves inputting data, observing the results, and indicating incorrect results. The machine learning system can then adjust its model (e.g., internal model 135) and the data can be fed through again, and again the results can be observed and incorrect results can be indicated to the machine learning system. This process can repeat until a satisfactory threshold of error (or correctness), desired number of cycles, or other predetermined condition is achieved. The model can then remain relatively static to be used for future problem solving (e.g., ranking search results). In an example, a portion of the input dataset can be used to further train a given model. In an example, 80% of input dataset can be used for user search result ranking and 20% can be used for continued model training. In an example training is carried out automatically. For example, if a desired output is known for a set of inputs, a training program can feed the inputs into the model, observe the outputs, and automatically indicate the incorrect results and adjust the model accordingly. In an example, the model can be trained manually, by using human observers to indicate incorrect results. In an example a mixture of automatic and manual training can be used.

In an example, the machine learning module 105 can include a training module 115 to train (e.g., to create or update) the internal model 135. The training module 115 can be configured to receive identification of the goal 130 (e.g., as one or more input labels), receive identification of an input dataset relevant to the goal 130, and input the input dataset to the machine learning system. In an example, the input dataset is one or more data factors 125 associated with the goal 130. In an example, the input dataset is provided to the training module 115. In an example, the training module 115 can be configured to retrieve the input dataset from, for example, a database or data system (e.g., a web service) from the provider or an external entity (e.g., a business partner or other data provider). The training module 115 can interact with an internal model 135 of the machine learning module 105. For example, the internal model 135 can be the machine learning system being trained by the training module 115. The internal model 135 can be any one of a variety of machine learning systems, including a neural network or an expert system among others. The internal model 135 can be initialized to a default state before training begins.

As the input dataset is applied to the internal model 135 the internal model 135 can produce an output (e.g., a given ranking for each result returned from a search query). The training module 115 can be configured to observe the output and identify errors in the output based on the goal 130. In an example, identifying the errors can be done automatically using the goal 130 as an input label. That is, the input label can define the desired output that can be compared with the output of the internal model 135. In an example, a user interface can be presented to an administrator in order to identify errors in the output of the internal model 135.

The training module 115 can be configured to iteratively refine the internal model's 135 output until a predetermined condition is met when the training module 115 receives errors in the output. In an example, the training module 115 can refine the output using one or more facilities of the internal model 135. For example, neural network systems often include a number of output "neurons" where the goal 130 can be realized as output on a first neuron and the internal model 135 observed output can be activation of a second neuron. When the first and second neurons are different, there is an observed error. The neural network can then accept the first (e.g., goal 130) neuron as input and adjust internal neuron connection weights to increase the likelihood that the second neuron is the first neuron (e.g., that the observed output equals the goal 130 output). The process can continue over several cycles, for example, until the predetermined condition is met. In an example, the predetermined condition is an error threshold. For example, if an error rate of 0.5% is desired (e.g., between the observed output and the goal 130) iterative training of the internal model 135 can end after the error rate is achieved. In an example, the predetermined condition can be a number of training cycles (e.g., 2,000). The training module 115 can be configured to perform the iterative process by adjusting the internal model 135, directly (e.g., setting neuron connection weights in a neural network based system) or indirectly (e.g., using a facility of the internal model 135), re-inputting the input dataset (e.g., data factors 125), observing the refined output of the internal model 135 to identify further errors in the refined output, and continuing until the predetermined condition is met.

The machine learning module 105 can be configured to output a goal model 140 after training the internal model 135. In an example, the trained internal model 135 becomes the goal model 140. In an example, the internal model 135 is copied to another location (e.g., data entry, system, etc.) and becomes the goal model 140. In an example, the goal model 140 can be further trained as described above with respect to the internal model 135. Goal models 140 can be created for different problems, or to address different goals, of the provider. For example, a relevance goal model can be created to ascertain the relevance between a search query and the item listings returned in search results. A revenue goal model can be created to ascertain the item listings returned in search results that can benefit (e.g., increase) provider revenue. Many different goal models 140 can be created to address the different goals of a provider. In an example, several goal models 140 can be combined together. In an example, the combination of goal models 140 can be weighted, such that adjusting relevance vis a vis revenue is as simple as adjusting the weights between the two goal models 140. In an example, a goal model 140 can be created to accept output from other goal models 140 (e.g., relevance and revenue goal models 140) and produce outputs that integrate the outputs of the other goal models 140.

The goal module 110 can be configured to input a plurality of data factors 125 into the goal model 140 to create a model output in response to a search query. In an example, the query module 150 can provide a user interface, data query system, or any combination of components to receive the search query and return a result set (e.g., of item listings). In an example, the query module can be configured to communicate query data (e.g., keywords, search string, time search was performed, returned results) to one or both of the factorization module 120 and the goal module 110. The factorization module 120, as described above, can then factorize the data for input into the goal model 140 by the goal module 110. In an example, the search results are factorized.

Model output from the goal model 140 can be communicated by the goal module 120 to a user 145. In an example, the presentation module 155 is configured to receive the model output and construct a user interface to display the search results to the user 145. In an example, the goal module 120 is configured to use the model output to order the search results and provide an ordered list of search results to the presentation module 155.

Figure 2:
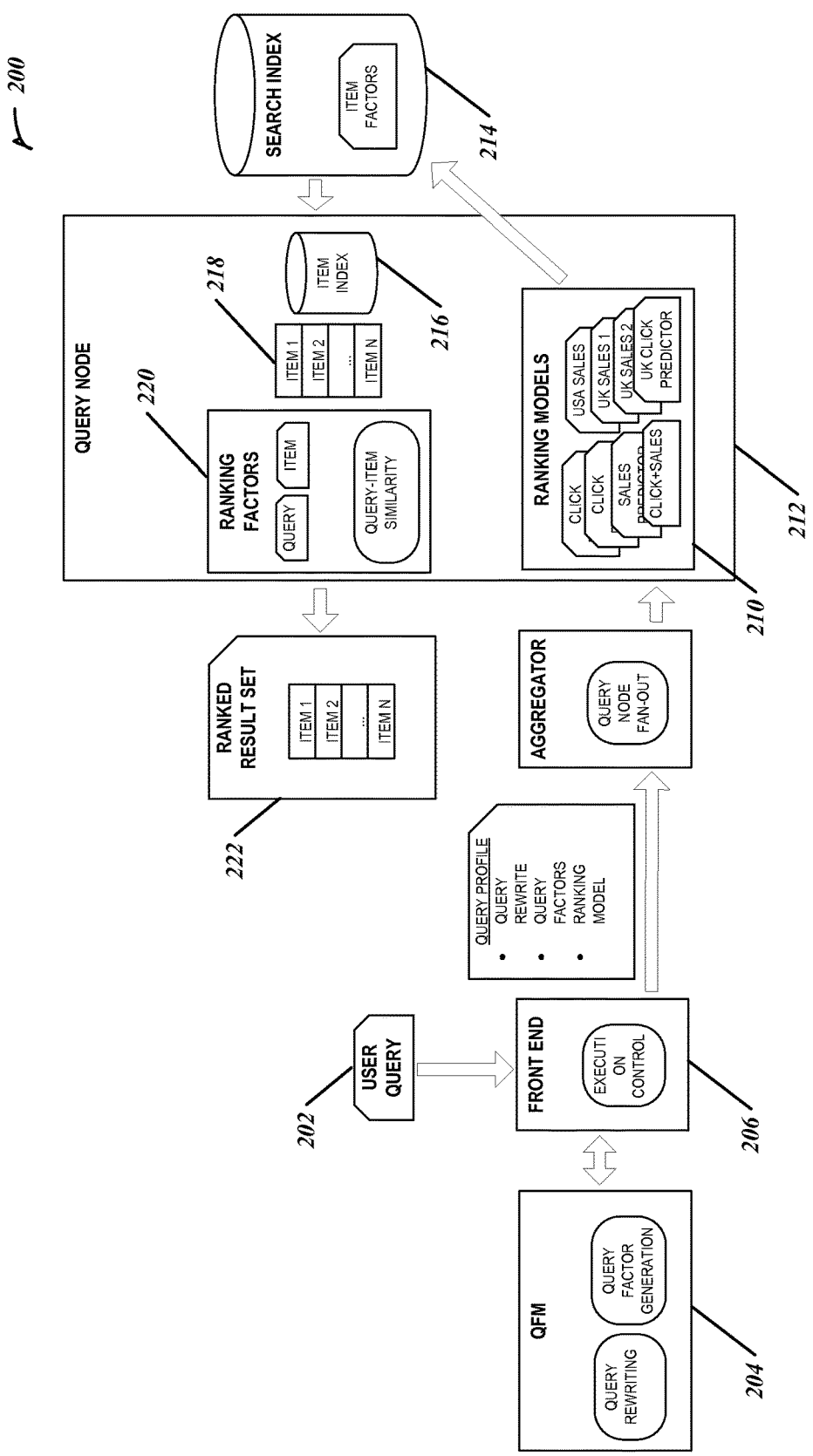
FIG. 2 is a block diagram illustrating details of an example system using machine learning models to rank search results, according to one embodiment.

FIG. 2 is a block diagram illustrating details of an example system 200 using machine learning models to rank search results. System 200 can include module 204, a query front end 206, a query node 212, and a database 214. The query node 212 may also contain a set of ranking models 210, an item index 216, and a set of ranking factors 220 corresponding to a query 202 and item listings 218 returned as a result of a search.

After one or more goal models 140 are created, they can be used to rank user search results. FIG. 2 illustrates the components to rank search results after goal model 140 creation. In an example, the query module 150, goal module 110, or the presentation module 155, can be used to implement various components described below. In example, components described below can be including into one or more of the query module 150, goal module 110, or the presentation module 155.

The front end 206 can receive a query 202 from a user. The front end 206 can then communicate with the query factorization module 204 to rewrite the query 202 and generate data factors 125 from the query 202 itself. The query profile can then be sent to the query node 212.

The query node 212 can apply one or more ranking goal models 210 to the query profile. In an example, the goal models 140 can also be used to select search results from database 214. The ranking goal models 210 can be combined as previously described, in various ways, including through various mathematical operations (e.g., addition and multiplication) and possibly with weights. The weights can be adjustable in order to easily adjust the influence of one goal model 140 vis a vis another goal model 140. This can be useful if, for example, revenue generation needs to increase while relevance has room to decrease, and so the revenue generation goal model 140 weight can be increased vis a vis the relevance goal model 140 weight.

The database 214 can return a search index of the item listings returned as a result of the query 202. In an example, item data factors 125 can also be returned with the item listings.

Item index 216 can include the raw returned item data to the query node 212 where the list of item listings 288 is unranked (e.g., unordered). The set of ranking data factors 220 can include all of the data factors 125 for a given item listing and query 202 to be used by the set of ranking goal models 210. The factors can be inputted into the ranking goal models 210 to produce a ranked result set 222 that can then be presented to the user 145. In an example, a higher ranked item listing can be displayed more prominently than a lower ranked item listing (e.g., the higher ranked item listing can appear higher in the list of search results presented to the user 145 than the lower ranked item listing. In an example, prominently displaying the higher ranked listings can include using color (e.g., varying background or foreground color), animation, or additional visual decorations (e.g., borders, titles, etc.).

In example systems 100 and 200, the search query is generally for items being sold in an online publishing system or marketplace, but other examples where a user queries a data resource and the results are ranked and returned are also contemplated. The various components of systems 100 and 200 can be executed in software, hardware, or some combination thereof. In the case of software components, it will be understood that the hardware necessary to execute the software will also be present.

Figure 3:
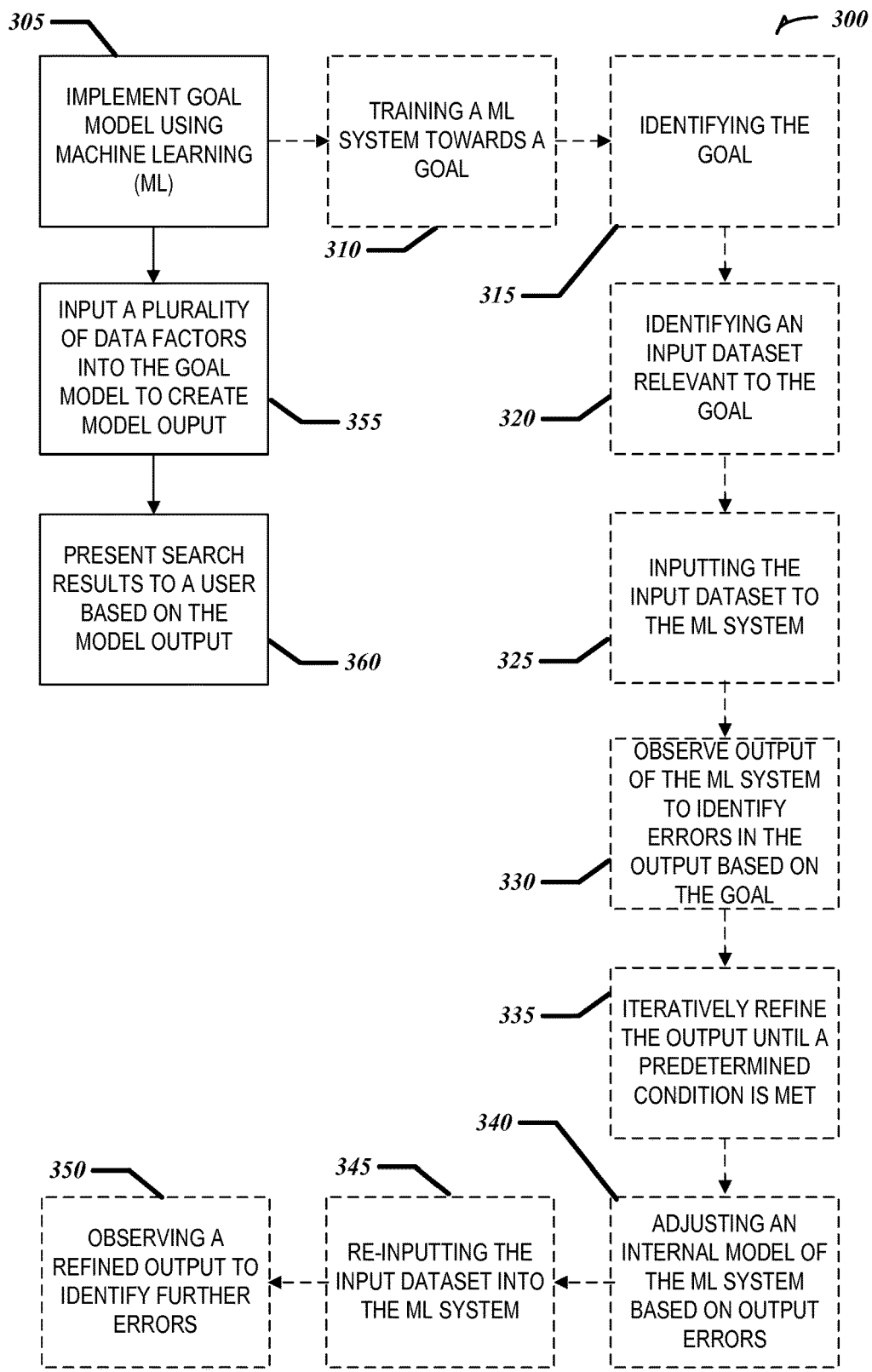
FIG. 3 is a flowchart illustrating an example method for search result ranking using machine learning, according to one embodiment.

FIG. 3 is a flowchart illustrating an example method 300 for search result ranking using machine learning, according to one embodiment. Some or all of the components from systems 100 or 200 can be used to implement method 300; however, other hardware and software components can also be used.

At 305 a goal model can be implemented (e.g., created, updated, or hosted) using machine learning. In an example, the goal model can be initialized to a default state and trained to implement the goal model.

At 310 a machine learning system (e.g., TreeNet) can be trained towards a goal to create the goal model. In an example, the goal can include a desired result given an input dataset. For example, if given five search results the goal can include an absolute ranking of the five search results. In an example, a goal is expressed in a standard format as an input label to the machine learning system. In an example, the input label can define the desired output of the machine learning system. In an example, the input label can define a predetermined condition (e.g., number of training cycles or error threshold) at which training will cease.

At 315 the goal can be identified. As previously discussed, the goal can include various data points (e.g., desired machine learning system output, predetermined condition to terminate training, etc.). The goal can also be a high level label for the model, such as revenue generation, relevance, business partner obligation, etc. Thus, referring to the goal can invoke the appropriate model for an administrator who is adjusting search result rankings.

At 320 an input dataset relevant to the goal can be identified. In an example, relevance of the input dataset can be determined by the provider based on historical data. In an example, input data set relevance can be determined by another goal model. In an example, the input data set can include one or more data factors; the data factors being data that is transformed into a standardized format as previously discussed.

At 325 the input dataset can be inputted into the machine learning system. Generally, such inputting of data will result in output of the machine learning system.

At 330 the output of the machine learning system can be observed to identify errors in the output based on the goal. For example, if given five search results, search result X is ranked fourth in the output but the goal established that X should be ranked first. The difference in the observed ranking of X is an error in the output.

At 335 the output of the machine learning system can be iteratively refined until a predetermined condition is met. As previously discussed, the predetermined condition can be a number of training cycles, an error threshold, or other metric.

At 340, iteratively refining the output can include adjusting an internal model of the machine learning system based on the errors in the output.

At 345 the input dataset can be re-inputted into the machine learning system. In an example, the input dataset is identical to the initial input dataset and completely inputted into the machine learning system.

At 350 the refined output (e.g., the output of the adjusted internal model) can be observed for further errors. Method 300 can continue at 340 until the predetermined condition is met.

At 355, after a complete goal is achieved (e.g., via creation or adoption from another source), a plurality of data factors can be inputted into the goal model to create a model output. In an example, model output can be a ranked list of search results. In an example, model output can be a set of weights associated with search results.

At 360 search results (e.g., in response to a user query) can be presented to a user based on the model output. For example, if the model output includes an ordered list of search results, then the list can be presented, in order, via a user interface (e.g., web page). In an example, if the model output includes a set of weights associated with each search result, a presentation engine can accept those weights with, possibly, other data to order the search results before displaying them to a user via a user interface.

Figure 4:
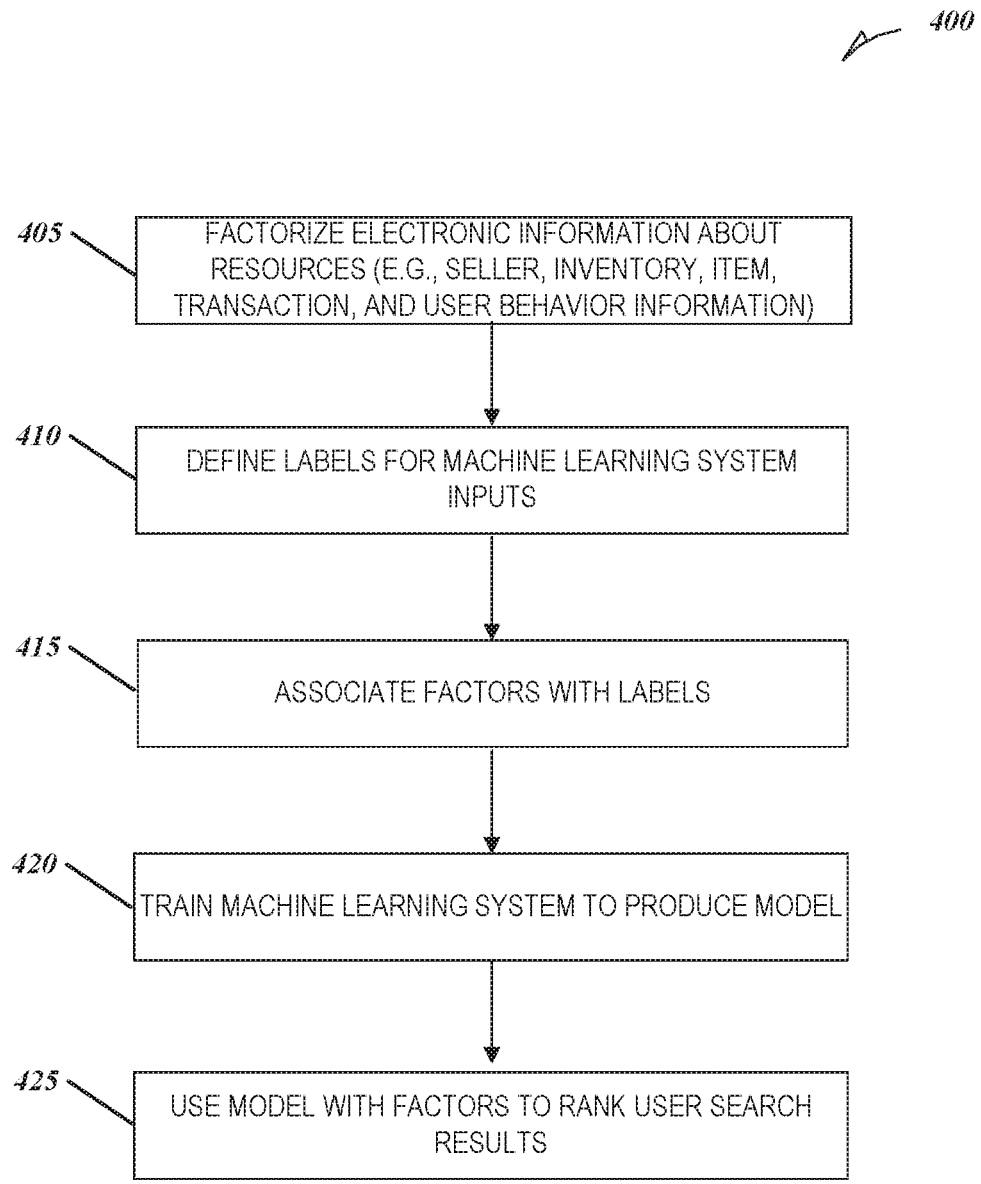
FIG. 4 is a flowchart illustrating an example method for search result ranking using machine learning, according to one embodiment.

FIG. 4 is a flowchart showing an example embodiment of a method 400 for search result ranking using machine learning. In various embodiments all or part of systems 100 or 200 can be used to implement the method 400.

At 405 data can be collected from various sources and factorized. In an example, the same data can be factorized into different observations (e.g., formats or collections of data) for use in different models. The information may include user behavior, transaction, business rule, partner, revenue, query, seller, and item data, among others. There is no restriction on the data that can be used as long as it can be factored. In an example a data reducer, or data reducer module, can be used to factor the data.

At 410 input labels for the machine learning system can be defined (e.g., from goals). Input labels can correspond to observations (particular data factors). In an example, the outputs of the machine learning system, or model, can be defined by the input label.

At 415 the data factors can be associated with the labels. As previously mentioned, this can be done through observations (e.g., an input label can map to a goal and a data factor can map to an observation relevant to the goal).

At 420 the machine learning system is trained to produce a model. Frequently, the machine learning system can start out with a model that is adjusted via the training process. In an example, the training process can involve repetition of the following: input data factors into the machine learning system; observe the results, and indicate errors to the machine learning system. In an example, the machine learning system can accept the inputs and apply its trained model (e.g., a weighted neural network, or decision tree) to produce the results. In an example, when incorrect results are indicated to the machine learning system, the machine learning system can backtrack from the incorrect output to the inputs contributing to that output, and adjust the path(s) in order to make that same incorrect output less likely. However, the adjustments are often small to because the absolute relevance of a given piece of input information often cannot be determined. Thus, the process is repeated many times, with small changes at each iteration, to achieve the desired accuracy. One advantage of this machine learning approach is that the approach itself identifies pertinent data from the inputs to achieve the desired outputs. Thus, many pieces of information can be used, whether or not they are particularly pertinent, and the machine learning system will sift through and identify the important pieces. This may free up human engineers from the task of identifying and weighting pertinent data, and may even discover relevance in data previously thought to be innocuous. Training can be automatic, manual, or a mixture of the two. In an example, engineers, or even end users, may indicate if the results are correct. In other examples, a program may contain the desired results for a given set of inputs, run the inputs, and automatically indicate errors to the machine learning system. In an example, the program can be another ranking tool whose results for given inputs are compared with the results of the model.

Once a model is produced, it can remain static (e.g., without further training it will produce the same results for given inputs). In an example, the model can be continually or continuously trained. For example, 80% of model's output can be used to produce useful results (e.g., ranking search results) while 20% of its output can be training. In this way, the model can evolve over time. In an example, the model can be updated on a periodic basis (e.g., daily, weekly, yearly, etc.).

At 425 the model can be used with data factors to rank user search results. As previously discussed, data factors associated with a search query and item listings in the search result list, as well as other data factors, can be inputted into one or more models. In an example, multiple models can be combined to produce a ranking score. The models can be weighted so that the influence of a model can be easily adjusted vis-à-vis other models. The produced ranking scores can then be applied to the item listings in the search results to order the item listings. For example, item listings can be presented to a user ordered from highest ranking score to lowest.

Figure 5:
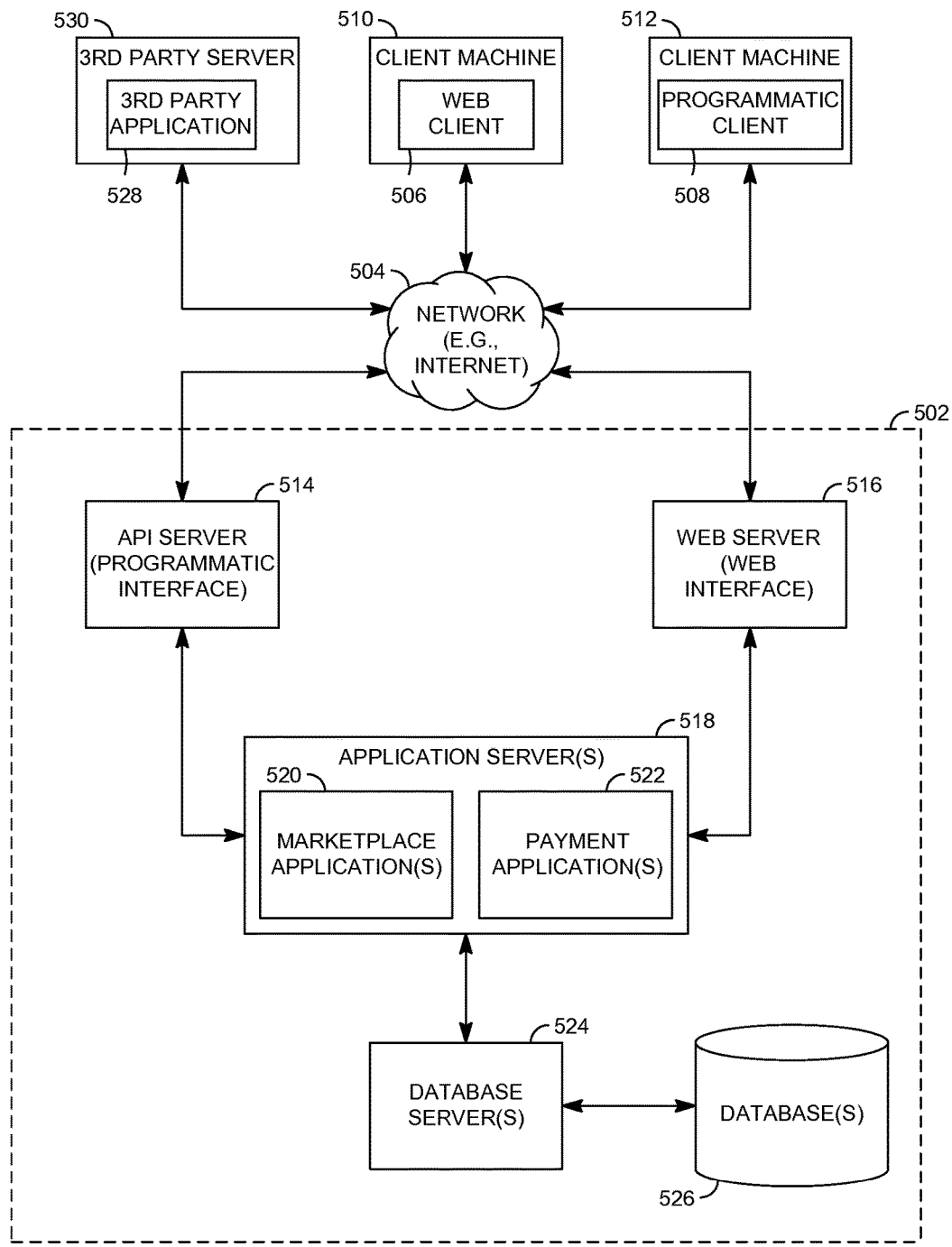
FIG. 5 is a network diagram illustrating a client-server system in which one or more embodiments can be deployed.

FIG. 5 is a network diagram depicting a client-server system 500, within which one example embodiment can be deployed. A networked system 502, in the example forms of a network-based marketplace or publication system, provides server-side functionality, via a network 504 (e.g., the Internet or Wide Area Network (WAN)) to one or more clients. FIG. 5 illustrates, for example, a web client 506 (e.g., a browser, such as the Internet Explorer browser developed by Microsoft Corporation of Redmond, Wash. State), and a programmatic client 508 executing on respective client machines 510 and 512.

An Application Program Interface (API) server 514 and a web server 516 are coupled to, and provide programmatic and web interfaces respectively to, one or more application servers 518. The application servers 518 host one or more marketplace applications 520 and payment applications 522. The application servers 518 are, in turn, shown to be coupled to one or more databases servers 524 that facilitate access to one or more databases 526.

The marketplace applications 520 may provide a number of marketplace functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 520. While the marketplace and payment applications 520 and 522 are shown in FIG. 5 to both form part of the networked system 502, it will be appreciated that, in alternative embodiments, the payment applications 522 may form part of a payment service that is separate and distinct from the networked system 502.

Further, while the system 500 shown in FIG. 5 employs a client server architecture, the present invention is of course not limited to such an architecture, and could equally well find application in a distributed, or peer-to-peer, architecture system, for example. The various marketplace and payment applications 520 and 522 could also be implemented as standalone software programs, which do not necessarily have networking capabilities.

The web client 506 accesses the various marketplace and payment applications 520 and 522 via the web interface supported by the web server 516. Similarly, the programmatic client 508 accesses the various services and functions provided by the marketplace and payment applications 520 and 522 via the programmatic interface provided by the API server 514. The programmatic client 508 may, for example, be a seller application (e.g., the TurboLister application developed by eBay Inc., of San Jose, Calif.) to enable sellers to author and manage listings on the networked system 502 in an off-line manner, and to perform batch-mode communications between the programmatic client 508 and the networked system 502.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace or payment functions that are supported by the relevant applications of the networked system 502.

Figure 6:
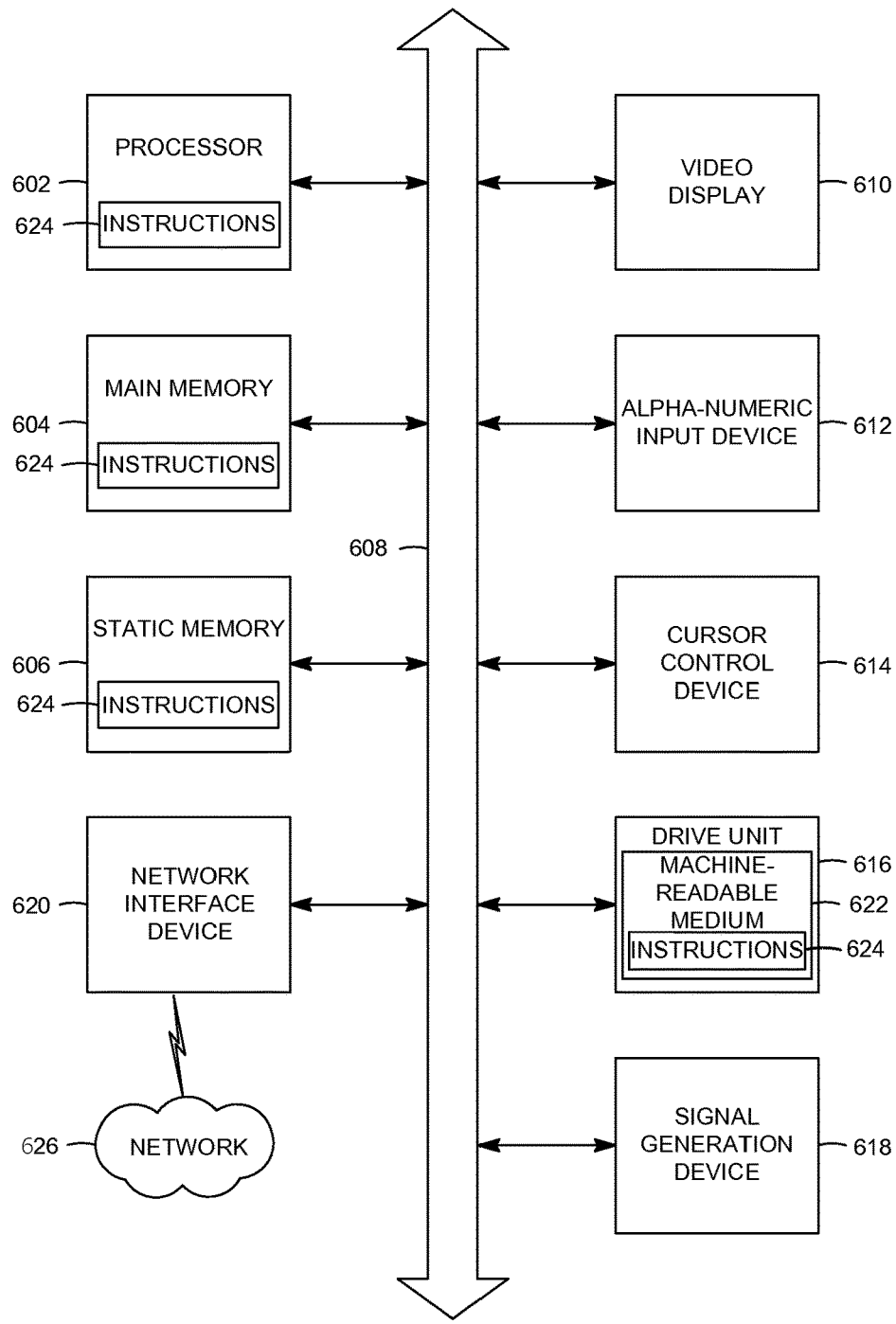
FIG. 6 is a block diagram illustrating an example machine upon which one or more embodiments may run.

FIG. 6 shows a diagrammatic representation of machine in the example form of a computer system 600 within which a set of instructions, for causing the machine to perform any one or more of the methodologies discussed herein, can be executed. In alternative embodiments, the machine operates as a standalone device or can be connected (e.g., networked) to other machines. In a networked deployment, the machine may operate in the capacity of a server or a client machine in server-client network environment, or as a peer machine in a peer-to-peer (or distributed) network environment. The machine can be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for search result ranking using machine learning have been described. Although the present invention has been described with reference to specific example embodiments, it will be evident that various modifications and changes can be made to these embodiments without departing from the broader spirit and scope of the invention. Accordingly, the specification and drawings are to be regarded in an illustrative rather than a restrictive sense.

While in the foregoing specification certain embodiments of the invention have been described, and many details have been set forth for purposes of illustration, it will be apparent to those skilled in the art that the inventive subject matter is susceptible to additional embodiments and that certain of the details described herein can be varied considerably without departing from the basic principles of the invention.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computer-implemented method for ordering search results in an online publishing system, the method comprising:
   receiving, by a server device, a first input label specifying at least a first goal;
   identifying, by the server device, a first set of data factor definitions based on the first input label;
   compiling, by the server device, a first set of data factors using the first set of data factor definitions;
   training, by the server device, a machine learning system using the first input label and the first set of data factors to create a first goal model for the first goal;
   receiving, by the server device, a second input label specifying at least a second goal, the second goal being different from the first goal;
   identifying, by the server device, a second set of data factor definitions based on the second input label, wherein the second set of data factor definitions is different than the first set of data factor definitions;
   compiling, by the server device, a second set of data factors using the second set of data factor definitions;

training, by the server device, the machine learning system using the second input label and the second set of data factors to create a second goal model for the second goal;
receiving, by the server device, an electronic search query and a selection of the first input label or the second input label; and
ordering, by the server device, search results by applying either the first goal model or the second goal model to the electronic search query based on the selection of the first input label or the second input label respectively, wherein applying either the first goal model or the second goal model comprises factorizing the electronic search query into either the first set of data factors or the second set of data factors, respectively, and inputting a factorized electronic search query into either the first goal model or the second goal model based on the selection of the first input label or the second input label.

2. The method of claim 1, wherein a data factor definition includes an identification of one or more data points that make up a corresponding data factor.

3. The method of claim 2, wherein compiling a set of data factors includes retrieving the one or more data points and factorizing the one or more data points into a standard format corresponding to an input label.

4. The method of claim 3, wherein factorizing the one or more data points includes aggregating a plurality of data points.

5. The method of claim 1, wherein a subset of data factors in the first set of data factors each have a first impact score corresponding to the first input label and also each have a second impact score corresponding to the second input label, impact scores measuring the degree to which corresponding data factors influence an output of a corresponding goal model.

6. The method of claim 5, wherein applying either the first goal model or the second goal model includes ranking either the first set of data factors or the second set of data factors using impact scores of respective data factors and using a group of either the first set of data factors or the second set of data factors based on the ranking and the selection of the first input label or the second input label.

7. The method of claim 1, wherein the first goal comprises one of maximizing revenue or cross product marketing.

8. A machine readable medium that is not a transitory propagating signal, the machine readable medium including instructions that, when executed by a machine, cause the machine to perform operations for ordering search results in an online publishing system, the operations comprising:
receiving a first input label specifying at least a first goal;
identifying a first set of data factor definitions based on the first input label;
compiling a first set of data factors using the first set of data factor definitions;
training a machine learning system using the first input label and the first set of data factors to create a first goal model for the first goal;
receiving a second input label specifying at least a second goal, the second goal being different from the first goal;
identifying a second set of data factor definitions corresponding based on the second input label, wherein the second set of data factor definitions is different than the first set of data factor definitions;
compiling a second set of data factors using the second set of data factor definitions;
training the machine learning system using the second input label and the second set of data factors to create a second goal model for the second goal;
receiving, by the server device, an electronic search query and a selection of the first input label or the second input label; and
ordering search results by applying either the first goal model or the second goal model to the electronic search query based on the selection of the first input label or the second input label respectively, wherein applying either the first goal model or the second goal model comprises factorizing the electronic search query into either the first set of data factors or the second set of data factors, respectively, and inputting a factorized electronic search query into either the first goal model or the second goal model based on the selection of the first input label or the second input label.

9. The machine readable medium of claim 8, wherein a data factor definition includes an identification of one or more data points that make up a corresponding data factor.

10. The machine readable medium of claim 9, wherein compiling a set of data factors includes retrieving the one or more data points and factorizing the one or more data points into a standard format corresponding to an input label.

11. The machine readable medium of claim 10, wherein factorizing the one or more data points includes aggregating a plurality of data points.

12. The machine readable medium of claim 8, wherein a subset of data factors in the first set of data factors each have a first impact score corresponding to the first label and also each have a second impact score corresponding to the second input label, impact scores measuring the degree to which corresponding data factors influence an output of a corresponding goal model.

13. The machine readable medium of claim 12, wherein applying either the first goal model or the second goal model includes ranking either the first set of data factors or the second set of data factors using impact scores of respective data factors and using a subset of either the first set of data factors or the second set of data factors based on the ranking and the selection of the first input label or the second input label.

14. A system for ordering search results in an online marketplace, the system, comprising:
execution hardware,
a machine learning module, performed by the execution hardware, configured to:
receive a first input label specifying at least a first goal;
identify a first set of data factor definitions based on the first input label;
compile a first set of data factors using the first set of data factor definitions;
receive a second input label specifying at least a second goal, the second goal being different from the first goal;
identify a second set of data factor definitions based on the second input label, wherein the second set of data factor definitions is different than the first set of data factor definitions; and
compile a second set of data factors using the second set of data factor definitions;
a training module, performed by the execution hardware, configured to:
train a machine learning system using the first input label and the first set of data factors to create a first goal model for the first goal; and train the machine learning system using the second input label and the second set of data factors to create a second goal model for the second goal; and a goal module, performed by the execution hardware, configured to receive an electronic search query and a selection of the first input label or the second input label and configured to order search results by applying either the first goal model or the second goal model to the electronic search query based on the selection of the first input label or the second input label respectively wherein applying either the first goal model or the second goal model comprises factorizing the electronic search query into either the first set of data factors or the second set of data factors, respectively, and inputting a factorized electronic search query into either the first goal model or the second goal model based on the selection of the first input label or the second input label.

15. The system of claim 14, wherein a data factor definition includes an identification of one or more data points that make up a corresponding data factor.

16. The system of claim 15, wherein to compile a set of data factors includes the machine learning module to retrieve the one or more data points and factorize the one or more data points into a standard format corresponding to an input label.

17. The system of claim 16, wherein to factorize the one or more data points includes aggregating a plurality of data points.

18. The system of claim 14, wherein a subset of data factors in the first set of data factors each have a first impact score corresponding to the first label and also each have a second impact score corresponding to the second input label, impact scores measuring the degree to which corresponding data factors influence a output of a corresponding goal model.

19. The system of claim 18, wherein to apply either the first goal model or the second goal model includes the machine learning module to rank either the first set of data factors or the second set of data factors using impact scores of respective data factors and using a subset of either the first set of data factors or the second set of data factors based on the ranking and the selection of the first input label or the second input label.

* * * * *